United States Patent
Shimada

(10) Patent No.: US 8,257,482 B2
(45) Date of Patent: Sep. 4, 2012

(54) WATER BASE INK FOR INK-JET RECORDING AND WATER BASE INK SET FOR INK-JET RECORDING

(75) Inventor: Kou Shimada, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 69 days.

(21) Appl. No.: 12/562,509

(22) Filed: Sep. 18, 2009

(65) Prior Publication Data

US 2010/0071591 A1 Mar. 25, 2010

(30) Foreign Application Priority Data

Sep. 19, 2008 (JP) ................. 2008-240286

(51) Int. Cl.
*C09D 11/02* (2006.01)

(52) U.S. Cl. .................. 106/31.86; 106/31.69
(58) Field of Classification Search ............... 106/31.86, 106/31.69
See application file for complete search history.

(56) References Cited

U.S. PATENT DOCUMENTS

| | | | | |
|---|---|---|---|---|
| 4,180,407 A * | 12/1979 | Gibson et al. | ............. | 106/31.64 |
| 5,603,971 A * | 2/1997 | Porzio et al. | ............. | 426/96 |
| 5,609,671 A | 3/1997 | Nagasawa | | |
| 5,837,045 A | 11/1998 | Johnson et al. | | |
| 6,458,192 B1 * | 10/2002 | Tsujio | ............. | 106/31.32 |
| 6,596,068 B1 * | 7/2003 | Ito et al. | ............. | 106/31.6 |
| 2003/0101905 A1 * | 6/2003 | Momose | ............. | 106/31.58 |
| 2007/0141141 A1 * | 6/2007 | Bateman et al. | ............. | 424/464 |

FOREIGN PATENT DOCUMENTS

| | | |
|---|---|---|
| JP | 08-003498 | 1/1996 |
| JP | 08-231910 | 9/1996 |
| JP | 2000-513396 | 10/2000 |

* cited by examiner

*Primary Examiner* — Melvin C Mayes
*Assistant Examiner* — Veronica F Faison
(74) *Attorney, Agent, or Firm* — Banner & Witcoff, Ltd.

(57) ABSTRACT

A water base ink for ink jet recording contains a self-dispersible pigment; water; at least one glycol ether selected from the group consisting of diethylene glycol butyl ether, dipropylene glycol propyl ether and triethylene glycol butyl ether; and methyl cellulose in an amount of 0.01% by weight to 0.5% by weight. The water base ink is capable of preventing the strike-through to the back surface of a recording paper, and further the water base ink is excellent in the printing density and drying property on the paper surface.

9 Claims, No Drawings

WATER BASE INK FOR INK-JET RECORDING AND WATER BASE INK SET FOR INK-JET RECORDING

CROSS REFERENCE TO RELATED APPLICATION

The present application claims priority from Japanese Patent Application No. 2008-240286 filed on Sep. 19, 2008 the disclosure of which is incorporated herein by reference in its entirety.

BACKGROUND OF THE INVENTION

1. Field of the Invention

The present invention relates to a water base ink for ink jet recording and a water base ink set for ink jet recording.

2. Description of the Related Art

In a case that high-speed printing is performed on recording papers by using a water base ink for ink jet recording containing water, water-soluble organic solvent and a coloring agent, the recording papers on which the recording has been performed (printed recording papers) are stored on a paper discharge tray such that a printed recording paper is overlaid on another printed paper on which the printing was performed before the printed recording paper. Therefore, in some cases, phenomenon called "transfer (ink transfer)" occurs that the ink on a surface of a printed recording paper dirties or stains the back surface of another printed recording paper printed after the printed recording paper and overlaid on the printed recording paper. To address this situation, it is a widely performed practice that glycol ethers are added to a water base ink for ink jet recording so as to enhance the permeability of the ink to the recording paper, consequently enhancing the drying performance of the ink on the paper surface.

However, if the permeability of the ink to the recording paper is excessively enhanced, this causes a phenomenon called "strike-through to the back surface (strike-through)" in which the ink permeates and arrives even at the back surface of the recording paper, in some cases. In such cases, it is feared that the printing density is lowered as a result. In particular, since a pigment ink is harder to permeate in the recording paper than a dye ink, there is a tendency that a penetrant is used for the pigment ink in an amount greater than that of the penetrant used for the dye ink. Therefore, the phenomenon of "strike-through" easily occurs in the pigment ink.

For the purpose of improving the abrasion resistance of a printed matter obtained by performing printing on a recording paper with a water base ink for ink-jet recording containing water, a water-soluble organic solvent and a pigment dispersion, Japanese Patent Application Laid-open No. 8-231910 proposes to add at least one of polysaccharose, cellulose derivative and modified starch, which are classified as so-called thickeners, at a relatively large blending amount of 3% by weight to 40% by weight with respect to the total amount of the ink.

However, the concentration of the thickener is too great in the water base ink for ink jet recording proposed by Japanese Patent Application Laid-open No. 8-231910. Therefore, in this water base ink for ink jet recording, the ink has a tendency to present (remain) locally on the surface of the recording paper or inside a portion of the recording paper in the vicinity of the paper surface, which in turn lowers the drying property of the ink on the paper surface, and consequently leads to a fear that the "transfer" might occur.

SUMMARY OF THE INVENTION

An object of the present invention is to solve the above-described problems associated with the conventional technique, and to provide a water base ink for ink-jet recording which is capable of suppressing or preventing the "strike-through to the back surface" while securing the permeability of the ink to the recording paper, and which has excellent printing density and excellent drying property on the paper surface as well.

The inventor of the present application found out that it is possible to suppress or prevent the "strike-through to the back surface" with a self-dispersible pigment since pigment particles of the self-dispersible pigment are easily fixed to fibers of the recording paper than those of a pigment which requires a dispersant; and found out that the above object can be achieved by using, together with the self-dispersible pigment, a relatively small amount of methyl cellulose as an anti striking-through agent (agent for preventing strike-through to the back surface) and specific glycol ether(s) as a penetrant at blending amount(s) in specific range(s) respectively. Thus, the inventor completed the present invention.

According to a first aspect of the present invention, there is provided a water base ink for ink-jet recording including: a self-dispersible pigment; water; at least one glycol ether selected from the group consisting of diethylene glycol butyl ether, dipropylene glycol propyl ether and triethylene glycol butyl ether; and methyl cellulose in an amount of 0.01% by weight to 0.5% by weight.

According to a second aspect of the present invention, there is provided a water base ink set for ink jet recording including: a pigment ink containing a self-dispersible pigment, water, at least one glycol ether selected from the group consisting of diethylene glycol butyl ether, dipropylene glycol propyl ether and triethylene glycol butyl ether, and methyl cellulose in an amount of 0.01% by weight to 0.5% by weight; and a dye ink containing a dye and water.

Since the water base ink for ink jet recording of the present invention uses a self-dispersible pigment, as the coloring agent, which exhibits satisfactory affinity with respect to the fibers of the recording paper, further uses a relatively small amount of methyl cellulose as the anti strike-through agent, and specific glycol ether(s) as the penetrant at blending amounts in specific ranges respectively. Accordingly, it is possible to suppress or prevent the strike-through to the back surface, further to prevent the printing density from lowering, thereby realizing satisfactory drying property on the paper surface.

DESCRIPTION OF THE PREFERRED EMBODIMENTS

The water base ink for ink-jet recording of the present invention contains a self-dispersible pigment; water; at least one glycol ether selected from the group consisting of diethylene glycol butyl ether, dipropylene glycol propyl ether and triethylene glycol butyl ether; and methyl cellulose in an amount of 0.01% by weight to 0.5% by weight. Namely, the water base ink for ink jet recording of the present invention is a pigment ink. As described above, the problem of the "strike-through" is serious in the pigment ink, and thus the present invention is effectively applicable to the pigment ink.

The self-dispersible pigment used in the water base ink for ink jet recording of the present invention is dispersible in water without using any dispersing agent owing to the fact, for example, that at least one of the hydrophilic functional group and the salt thereof including, for example, carboxyl group, carbonyl group, hydroxyl group, and sulfon group is introduced into the surfaces of the pigment particles by the chemical bond directly or with any polyvalent group intervening therebetween.

As the self-dispersible pigment, it is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396. Further, any commercially available product may be used for the self-dispersible pigment. The commercially available product includes, for example, "CAB-O-JET™ 200, 250, 260, 270, 300 and 700" produced by Cabot Specialty Chemicals, "BONJET™ BLACK CW-1, CW-2, AND CW-3" produced by Orient Chemical Industries, Ltd., and "LIOJET™ WD BLACK 002C" produced by Toyo Ink Mfg. Co., Ltd. In the present invention, it is preferable to use a self-dispersible pigment, such as CAB-O-JET™ 300, in which the carboxyl group is introduced as the surface functional group by the surface treatment.

As a material for the self-dispersible pigment, it is allowable to use any one of inorganic pigments and organic pigments. The inorganic pigment, which is suitable for the surface treatment, includes, for example, "MA8 and 100" produced by Mitsubishi Chemical Corporation and "Color Black FW200" produced by Degussa. The organic pigment suitable for the surface treatment includes, for example, insoluble azo pigment such as Toluidine Red, Toluidine Marron, Hansa Yellow, Benzidine Yellow, Pyrazolone Red; insoluble azo pigment such as Lithol Red, Helio Bordeaux, Pigment Scarlet, Permanent Red 2B; Vat dye derivative such as Alizarin, Indanthrone, Thioindigo Marron; Phthalocyanine pigment such as Phthalocyanine Blue, Phthalocyanine Green; Quinacridone pigment such as Quinacridone Red, Quinacridone Magenta; Perylene pigment such as Perylene Red, Perylene Scarlet; Isoindolinone pigment such as Isoindolinone Yellow, Isoindolinone Orange; Isoindoline pigment; Pyranthrone pigment such as Pyranthrone Red, Pyranthrone Orange; Thioindigo pigment; Condensed Azo pigment; Benzimidazolone pigment; Quinophthalone pigment such as Quinophthalone Yellow; Flavanthrone Yellow; Acylamido Yellow; Nickel Azo Yellow; Copper Azomethine Yellow; Perinone Orange; Anthrone Orange; Dianthraquinonyl Red; Dioxazine Violet; etc. Among the above-mentioned organic pigments, it is particularly preferable to use at least one organic color pigment selected from the group consisting of Quinacridone pigment, Phthalocyanine pigment, Benzimidazolone pigment, Isoindolinone pigment and Quinophthalone pigment, in view of the light resistance, etc. Specifically, C.I. Pigment Yellow 74, C.I. Pigment Yellow 155, C.I. Pigment Red 122, C.I. Pigment Blue 15:3, C.I. Pigment Blue 15:4 are preferably used.

If the particle size of the self-dispersible pigment is too great, there is a fear that the pigment might sediment or sink during the storage period of the ink, and if the particle size is too small, it is feared that the pigment particles might aggregate or coagulate, thus making it difficult for the pigment to be stably dispersed in the ink. Therefore, the mean particle size is preferably 10 nm to 150 nm, more preferably 50 nm to 130 nm.

If the blending amount of the self-dispersible pigment with respect to the total amount of the ink is too small, then required printing density cannot be obtained. On the other hand, if the blending amount of the self-dispersible pigment with respect to the total amount of the ink is too great, then clog-up of the nozzles are caused thereby. Accordingly, the blending amount of the self-dispersible pigment with respect to the total amount of the ink is preferably 0.5% by weight to 15% by weight, more preferably 1% by weight to 10% by weight.

The water base ink for ink jet recording uses methyl cellulose as the anti strike-through agent. As for such methyl cellulose, it is preferably use, in view of obtaining the desirable effects of the invention, methyl cellulose having a methoxy substitution degree of 25% to 35%, and exhibiting a viscosity of 20 cP to 30 cP in a solution which is obtained by dissolving 20 g of the methyl cellulose in a water at 20° C. and which has a total volume of 1 liter. Further, with respect to the methyl cellulose having such characteristics, if the molecular weight of the methyl cellulose is too small, then the ink containing the methyl cellulose is easily permeated into the recording paper, and it is feared that the ink might cause the "strike-through"; and if the molecular weight of the methyl cellulose is too great, then the viscosity of the ink becomes higher even when the methyl cellulose is used in a small amount, and it is feared that the ink might be rendered unsuitable. Thus, it is more preferable to use methyl cellulose having a weight-average molecular weight of 55,000 to 65,000. Note that in the present invention, the term "methyl cellulose" is used in a narrow sense, and does not include any methyl cellulose derivative and the salt thereof such as sodium carboxymethyl cellulose and hydroxy propyl methyl cellulose.

The blending amount of the methyl cellulose in the total amount of the water base ink for ink-jet recording is 0.01% by weight to 0.5% by weight, and in view of the total evaluation of the three characteristics which are the printing density, drying property on paper and the prevention of the "strike-through", preferably 0.05% by weight to 0.3% weight. If the blending amount of the methyl cellulose is less than 0.01% by weight, then the effect of preventing the "strike-through" is not sufficient; and if the blending amount exceeds 0.5% by weight, then the drying property on paper surface is not sufficient. In a case that the effect of preventing the "strike-through" is particularly important, the blending amount of the methyl cellulose in the total amount of the water base ink for ink jet recording is preferably 0.1% by weight to 0.5% by weight.

The water base ink for ink-jet recording of the present invention uses, as the penetrant, at least one glycol ether (specific glycol ether) selected from the group consisting of diethylene glycol butyl ether, dipropylene glycol propyl ether and triethylene glycol butyl ether. In a case that any other glycol ether(s) is/are used, instead of the above specific glycol ether or ethers, then either one of the effect of preventing "strike-through" and the drying property on paper surface becomes insufficient. In particular, in view of the prevention of the "strike-through", it is preferable to use dipropylene glycol propyl ether or triethylene glycol butyl ether.

The blending amount of the specific glycol ether in the total amount of the water base ink for ink jet recording is 0.3% by weight to 5% by weight, and preferably 0.5% by weight to 3% by weight. If the blending amount of the specific glycol ether is less than 0.3% by weight, then the drying property on paper surface is not sufficient; and if the blending amount exceeds 5% by weight, then the effect of preventing "strike-through" is not sufficient.

As the water used in the water base ink for ink jet recording of the present invention, it is preferable to use a pure water (purified water) or a deionized water. The blending amount of the water in the total amount of the water base ink for ink jet recording is determined within a wide range depending on the kind and composition of the specific glycol ether and a humectant (which will be described below), desired ink characteristics, etc. The blending amount of the water is preferably 10% by weight to 95% by weight, more preferably 10% by weight to 80% by weight, much more preferably 20% by weight to 80% by weight.

The water base ink for ink-jet recording of the present invention may further contain a humectant having anti-drying effect of the ink mainly at an end portion of the ink jet head.

As the humectant, it is allowable to use, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; glycerol; 2-pyrrolidone; N-methyl-2-pyrrolidone; and 1,3-dimethyl-2-imidazolidinone. In particular, it is preferable to use polyvalent alcohols such as alkylene glycol and glycerol.

The blending amount of the humectant in the total amount of the water base ink for ink jet recording is 0% by weight to 95% by weight, preferably 5% by weight to 80% by weight, and more preferably 5% by weight to 50% by weight.

The water base ink for ink jet recording of the present invention may further contain, as necessary, conventionally known additives such as viscosity-adjusting agents such as polyvinyl alcohol, polyvinyl pyrrolidone and water-soluble resin; surface tension-adjusting agents; fungicidal agents; pH-adjusting agents; etc.

The water base ink for ink jet recording of the present invention can be prepared by uniformly or homogeneously mixing the self-dispersible pigment, the water, the specific glycol ether(s), methyl cellulose and other additives such as humectant, and by removing undissolved substance or matter with a filter.

The water base ink for ink jet recording of the present invention can be filled in an ink cartridge adaptable to a conventionally known ink jet recording apparatus, and can be used for ink-jet recording. Further, by combining the water base ink for ink jet recording of the present invention with a dye ink, it is possible to provide a water base ink set for ink jet recording. As the dye ink, a known dye ink may be used; and the dye ink mainly contains, for example, a dye, water and a water-soluble organic solvent. The methyl cellulose may be also contained in the dye ink, similarly with the pigment ink.

EXAMPLES

Example 1

0.1% by weight of methyl cellulose, 1.5% by weight of diethylene glycol butyl ether, 25% by weight of glycerol, 0.12% by weight of SUNNOL™ NL1430 and 40.28% by weight of pure water were mixed uniformly or homogenously to prepare a mixed solution. Subsequently, the mixed solution was added to CAB-O-JET™ 300 such that the weight ratio of the mixed solution: CAB-O-JET™ 300=67:33, followed by being mixed uniformly. After that, the obtained mixed solution was filtrated through a cellulose acetate membrane filter (pore size 3.00 μm) produced by Toyo Roshi Kaisha, Ltd., and thus the water-base ink for ink jet recording of Example 1 (pigment ink) was prepared. The obtained water base ink for ink jet recording was filled in an ink cartridge, and then the cartridge was attached to a digital multi-function machine DCP-330C provided with an ink-jet printer produced by Brother Kogyo Kabushiki Kaisha, and solid printing (3 cm×3 cm square; Resolution: 600 dpi×600 dpi; 100% duty) was performed on a regular paper sheet (Laser Print produced by Hammermill). Afterwards, as explained below, (a) Strike-through evaluation, (b) Printing density evaluation and (c) Evaluation of drying property on paper surface were performed. The methyl cellulose used for preparing the pigment ink of Example 1 had the following characteristics. Methoxy substitution degree of the methyl cellulose is 25% to 35%; viscosity of one liter solution, which was obtained by dissolving 20 g of the methyl cellulose in the water at 20° C., is 20 cP to 30 cP; and a weight-average molecular weight of the methyl cellulose is 55,000 to 65,000.

(a) Strike-Through Evaluation

Luminosity ($L^*$) was measured with respect to the back surface of each of solid printed portion and non printed portion, by using a spectrophotometric colorimetry meter Spectrolino (measurement condition: light source: $D_{50}$, field: 2°, ANSI T) produced by Gretag Macbeth. Afterwards, change rate (luminosity change rate) of the luminosity of the back surface of the solid printed portion with respect to the luminosity of the back surface of the non printed portion was calculated based on Expression (1), and the evaluation was made in accordance with the following evaluation criterion. The luminosity change rate and the evaluation results were indicated in Table 1. In the evaluation criterion for the strike-through evaluation, "G" means "good", and "NG" means "no good".

$$\text{Luminosity Change Rate (\%)} = \frac{\text{Luminosity of non printed back surface} - \text{Luminosity of solid printed back surface}}{\text{Luminosity of non printed back surface}} \times 100 \qquad (1)$$

Criterion for Strike-Through Evaluation
    G: Luminosity change rate was not more than 6%.
    NG: Luminosity change rate exceeded 6%.

(b) Evaluation of Printing Density

The optical density (OD) value was measured with respect to the surface of the solid printed portion by using a spectrophotometric colorimetry meter Spectrolino (measurement condition: light source: $D_{50}$, field: 2°, ANSI T) produced by Gretag Macbeth. Then, the evaluation of the optical density (OD) value was made in accordance with the following evaluation criterion. The optical density (OD) value and the evaluation results are indicated in Table 1. In the evaluation criterion for the printing density evaluation, "G" means "good", and "NG" means "no good".

Criterion for Printing Density Evaluation
    G: OD value was not less than 1.30.
    NG: OD value was less than 1.30.

(c) Evaluation of Drying Property on Paper Surface

With respect to the surface of the solid printed portion immediately after the printing, time (drying time) required until the ink in liquid state could not be visually confirmed. Then, the evaluation was made in accordance with the following evaluation criterion. The drying time and the evaluation results are indicated in Table 1. In the evaluation criterion for the drying property on paper surface, "G" means "good", and "NG" means "no good".

Criterion for Evaluation of Drying Property on Paper Surface
    G: Drying time was not more than 5 seconds.
    NG: Drying time exceeded 5 seconds.

TABLE 1

| | | EX. 1 | EX. 2 | EX. 3 | EX. 4 | EX. 5 | EX. 6 | EX. 7 | EX. 8 |
|---|---|---|---|---|---|---|---|---|---|
| INK COMPOSITION | CAB-O-JET (trade name) 300*[1] | 33.0 | 33.0 | 33.0 | 33.0 | 33.0 | 33.0 | 33.0 | 33.0 |
| | Carbon Black | — | — | — | — | — | — | — | — |
| | methyl cellulose*[2] | 0.1 | 0.01 | 0.1 | 0.5 | 0.01 | 0.1 | 0.5 | 0.05 |
| | sodium carboxy methylcellulose*[3] | — | — | — | — | — | — | — | — |
| | hydroxypropyl methylcellulose*[4] | — | — | — | — | — | — | — | — |
| | diethylene glycol butyl ether | 1.5 | — | — | — | — | — | — | — |
| | triethylene glycol butyl ether | — | 1.5 | 1.5 | 1.5 | — | — | — | — |
| | dipropylene glycol propyl ether | — | — | — | — | 1.5 | 1.5 | 1.5 | 1.5 |
| | ethylene glycol hexyl ether | — | — | — | — | — | — | — | — |
| | diethylene glycol ethyl ether | — | — | — | — | — | — | — | — |
| | diethylene glycol diethyl ether | — | — | — | — | — | — | — | — |
| | diethylene glycol monohexyl ether | — | — | — | — | — | — | — | — |
| | triethylene glycol monomethyl ether | — | — | — | — | — | — | — | — |
| | dipropylene glycol monomethyl ether | — | — | — | — | — | — | — | — |
| | glycerol | 25 | 25 | 25 | 25 | 25 | 25 | 25 | 25 |
| | SUNNOL (trade name) NL1430*[5] | 0.12 | 0.12 | 0.12 | 0.12 | 0.12 | 0.12 | 0.12 | 0.12 |
| | DISPERBYK (trade name)-190*[6] | — | — | — | — | — | — | — | — |
| | water | balance | balance | balance | balance | balance | balance | balance | balance |
| EVALUATION | Strike-Through — Luminosity Change Rate (%) | 5.6 | 3.7 | 5.1 | 3.1 | 4.3 | 4.1 | 3.2 | 4.3 |
| | Evaluation | G | G | G | G | G | G | G | G |
| | Printing Density — Optical Density (OD) value | 1.50 | 1.52 | 1.55 | 1.44 | 1.50 | 1.55 | 1.42 | 1.50 |
| | Evaluation | G | G | G | G | G | G | G | G |
| | Drying property on sheet surface — Drying Time (second) | 5 | 5 | 5 | 5 | 5 | 5 | 5 | 5 |
| | Evaluation | G | G | G | G | G | G | G | G |

| | | COM. EX. 1 | COM. EX. 2 | COM. EX. 3 | COM. EX. 4 | COM. EX. 5 | COM. EX. 6 | COM. EX. 7 |
|---|---|---|---|---|---|---|---|---|
| INK COMPOSITION | CAB-O-JET (trade name) 300*[1] | 33.0 | 33.0 | 33.0 | 33.0 | 33.0 | 33.0 | 33.0 |
| | Carbon Black | — | — | — | — | — | — | — |
| | methyl cellulose*[2] | 0.005 | 0.6 | 0.005 | 0.6 | 0.1 | 0.1 | 0.1 |
| | sodium carboxy methylcellulose*[3] | — | — | — | — | — | — | — |
| | hydroxypropyl methylcellulose*[4] | — | — | — | — | — | — | — |
| | diethylene glycol butyl ether | — | — | — | — | — | — | — |
| | triethylene glycol butyl ether | 1.5 | 1.5 | — | — | — | — | — |
| | dipropylene glycol propyl ether | — | — | 1.5 | 1.5 | — | — | — |
| | ethylene glycol hexyl ether | — | — | — | — | 1.5 | — | — |
| | diethylene glycol ethyl ether | — | — | — | — | — | 1.5 | — |
| | diethylene glycol diethyl ether | — | — | — | — | — | — | 1.5 |
| | diethylene glycol monohexyl ether | — | — | — | — | — | — | — |
| | triethylene glycol monomethyl ether | — | — | — | — | — | — | — |
| | dipropylene glycol monomethyl ether | — | — | — | — | — | — | — |
| | glycerol | 25 | 25 | 25 | 25 | 25 | 25 | 25 |

TABLE 1-continued

|  |  |  |  |  |  |  |  |  |
|---|---|---|---|---|---|---|---|---|
|  | SUNNOL (trade name) NL1430*5 |  | 0.12 | 0.12 | 0.12 | 0.12 | 0.12 | 0.12 | 0.12 |
|  | DISPERBYK (trade name)-190*6 |  | — | — | — | — | — | — | — |
|  | water |  | balance | balance | balance | balance | balance | balance | balance |
| EVALUATION | Strike-Through | Luminosity Change Rate (%) | 6.1 | 3.0 | 8.2 | 3.1 | 8.3 | 3.8 | 5.1 |
|  |  | Evaluation | NG | G | NG | G | NG | G | G |
|  | Printing Density | Optical Density (OD) value | 1.40 | 1.42 | 1.41 | 1.40 | 1.52 | 1.51 | 1.46 |
|  |  | Evaluation | G | G | G | G | G | G | G |
|  | Drying property on sheet surface | Drying Time (second) | 5 | 15 | 5 | 10 | 5 | 20 | 10 |
|  |  | Evaluation | G | NG | G | NG | G | NG | NG |

|  |  |  | COM. EX. 8 | COM. EX. 9 | COM. EX. 10 | COM. EX. 11 | COM. EX. 12 | COM. EX. 13 | COM. EX. 14 |
|---|---|---|---|---|---|---|---|---|---|
| INK COMPOSITION | CAB-O-JET (trade name) Carbon Black |  | 33.0 | 33.0 | 33.0 | 33.0 | 33.0 | 33.0 | 33.0 |
|  | methyl cellulose*2 |  | 0.1 | 0.1 | 0.1 | — | — | — | — |
|  | sodium carboxy methylcellulose*3 |  | — | — | — | 0.1 | 0.1 | — | — |
|  | hydroxypropyl methylcellulose*4 |  | — | — | — | — | — | 0.1 | 0.1 |
|  | diethylene glycol butyl ether |  | — | — | — | — | — | — | — |
|  | triethylene glycol butyl ether |  | — | — | — | 1.5 | — | 1.5 | — |
|  | dipropylene glycol propyl ether |  | — | — | — | — | 1.5 | — | 1.5 |
|  | ethylene glycol hexyl ether |  | — | — | — | — | — | — | — |
|  | diethylene glycol ethyl ether |  | — | — | — | — | — | — | — |
|  | diethylene glycol diethyl ether |  | — | — | — | — | — | — | — |
|  | diethylene glycol monohexyl ether |  | 1.5 | — | — | — | — | — | — |
|  | triethylene glycol monomethyl ether |  | — | 1.5 | — | — | — | — | — |
|  | dipropylene glycol monomethyl ether |  | — | — | 1.5 | — | — | — | — |
|  | glycerol |  | 25 | 25 | 25 | 25 | 25 | 25 | 25 |
|  | SUNNOL (trade name) NL1430*5 |  | 0.12 | 0.12 | 0.12 | 0.12 | 0.12 | 0.12 | 0.12 |
|  | DISPERBYK (trade name)-190*6 |  | — | — | — | — | — | — | — |
|  | water |  | balance | balance | balance | balance | balance | balance | balance |
| EVALUATION | Strike-Through | Luminosity Change Rate (%) | 6.5 | 4.0 | 4.5 | 11.6 | 11.3 | 7.1 | 8.6 |
|  |  | Evaluation | NG | G | G | NG | NG | NG | NG |
|  | Printing Density | Optical Density (OD) value | 1.53 | 1.51 | 1.50 | 1.42 | 1.43 | 1.48 | 1.46 |
|  |  | Evaluation | G | G | G | G | G | G | G |
|  | Drying property on sheet surface | Drying Time (second) | 10 | 20 | 10 | 5 | 3 | 3 | 1 |
|  |  | Evaluation | NG | NG | NG | G | G | G | G |

|  |  | COM. EX. 15 | COM. EX. 16 | COM. EX. 17 | COM. EX. 18 | COM. EX. 19 |
|---|---|---|---|---|---|---|
| INK COMPOSITION | CAB-O-JET (trade name) 300*1 | 33.0 | 33.0 | — | — | — |
|  | Carbon Black | — | — | 5.0 | 5.0 | 5.0 |
|  | methyl cellulose*2 | — | — | 0.1 | 0.1 | 0.1 |
|  | sodium carboxy methylcellulose*3 | — | — | — | — | — |
|  | hydroxypropyl methylcellulose*4 | — | — | — | — | — |
|  | diethylene glycol butyl ether | — | — | — | — | — |
|  | triethylene glycol butyl ether | 1.5 | — | 1.5 | — | — |

TABLE 1-continued

|  |  |  |  |  |  |  |  |
|---|---|---|---|---|---|---|---|
|  | dipropylene glycol propyl ether |  | — | 1.5 | — | 1.5 | — |
|  | ethylene glycol hexyl ether |  | — | — | — | — | — |
|  | diethylene glycol ethyl ether |  | — | — | — | — | — |
|  | diethylene glycol diethyl ether |  | — | — | — | — | — |
|  | diethylene glycol monohexyl ether |  | — | — | — | — | 1.5 |
|  | triethylene glycol monomethyl ether |  | — | — | — | — | — |
|  | dipropylene glycol monomethyl ether |  | — | — | — | — | — |
|  | glycerol |  | 25 | 25 | 25 | 25 | 25 |
|  | SUNNOL (trade name) NL1430*5 |  | 0.12 | 0.12 | 0.12 | 0.12 | 0.12 |
|  | DISPERBYK(trade name)-190*6 |  | — | — | 3.0 | 3.0 | 3.0 |
|  | water |  | balance | balance | balance | balance | balance |
| EVALUATION | Strike-Through | Luminosity Change Rate (%) | 13.2 | 16.2 | 7.3 | 7.6 | 9.6 |
|  |  | Evaluation | NG | NG | NG | NG | NG |
|  | Printing Density | Optical Density (OD) value | 1.34 | 1.33 | 1.04 | 1.03 | 1.06 |
|  |  | Evaluation | G | G | NG | NG | NG |
|  | Drying property on sheet surface | Drying Time (second) | 10 | 5 | 20 | 15 | 20 |
|  |  | Evaluation | NG | G | NG | NG | NG |

*[1]Produced by Cabot Specialty Chemicals; Carbon black concentration: 15% (pigment solid content amount with respect to the ink total amount = 5%)
*[2],*[3]Produced by Kanto Chemical Co., Inc.
*[4]Produced by Shin-Etsu Chemical Co., Ltd.
*[5]sodium polyoxyethylene alkyl (C = 12, 13) ether sulfate (3EO), produced by Lion Corporation
*[6]Polymeric pigment dispersant, produced by BYK-Chemie GmbH Examples 2-8

Water-base inks for ink-jet recording of Examples 2-8 were prepared with the same procedure as that for preparing the ink of Example 1, except that the components indicated in Table 1 were used; and (a) Strike-through evaluation, (b) Printing density evaluation and (c) Evaluation of drying property on paper surface were performed in the same manner as in Example 1.

Comparative Examples 1-16

Water-base inks for ink-jet recording of Comparative Examples 1-16 were prepared with the same procedure as that for preparing the ink of Example 1, except that the components indicated in Table 1 were used; and (a) Strike-through evaluation, (b) Printing density evaluation and (c) Evaluation of drying property on paper surface were performed in the same manner as in Example 1.

Comparative Example 17

Carbon black dispersion was obtained by mixing 10 parts by weight of Carbon Black, 6 parts by weight of DISPER-BYK™-190, 12 parts by weight of glycerol and 72 parts by weight of pure water, and then by performing a dispersing treatment with a wet sand mill by using a medium composed of zirconia beads having a diameter of 0.3 mm. Further, 29.28 parts by weight of pure water, 0.1 part by weight of methyl cellulose, 19 parts by weight of glycerol, 1.5 parts by weight of triethylene glycol butyl ether, and 0.12 parts by weight of SUNNOL™ NL1430 were mixed uniformly to prepare 50 parts by weight of mixed solution (ink solvent). Subsequently, 50 parts by weight of the prepared ink solvent was gradually added to 50 parts by weight of the carbon black dispersion which had been agitated, followed by being agitated further for 30 minutes. After that, the obtained mixed solution was filtrated through a cellulose acetate membrane filter (pore size 3.00 µm) produced by Toyo Roshi Kaisha, Ltd., and thus the water-base ink for ink jet recording of Comparative Example 17 was prepared. With respect to the obtained water-base ink, (a) Strike-through evaluation, (b) Printing density evaluation and (c) Evaluation of drying property on paper surface were performed, in the same manner as in Example 1.

Comparative Examples 18 and 19

Water-base inks for ink-jet recording of Comparative Examples 18 and 19 were prepared with the same procedure as that for preparing the ink of Comparative Example 17, except that the components indicated in Table 1 were used; and (a) Strike-through evaluation, (b) Printing density evaluation and (c) Evaluation of drying property on paper surface were performed, in the same manner as in Example 1.

From Table 1, it is appreciated that with each of the water base inks for ink jet recording of Examples 1-8, the good results (G) were obtained with respect to all of the evaluation items.

On the other hand, although the water base inks for ink jet recording of Comparative Examples 1 and 3 used the methyl cellulose, the blending amount of the methyl cellulose is smaller than that of the water base inks of Examples 1 to 8, and thus the "strike-through" evaluation was low. Although the water base inks for ink-jet recording of Comparative Examples 2 and 4 used the methyl cellulose, the blending amount of the methyl cellulose is greater than that of the water base inks of Examples 1 to 8, and thus the evaluation of drying property on paper surface was low. Since each of the water base ink for ink-jet recording of Comparative Examples 5-10 did not use the specific glycol ether, at least one of the strike-through evaluation and the evaluation of the drying property on paper surface was not good (NG). Since each of the water base ink for ink-jet recording of Comparative Examples 11-14 used other cellulose-base thickeners, instead of the methyl cellulose; and thus the strike-through evaluation was not good (NG). Accordingly, it is appreciated that the effect of preventing the strike-through obtained by the methyl cellulose was superior to that obtained by the other cellulose-based thickeners used in the comparative examples. Each of the water base ink for ink-jet recording of Comparative Examples 15 and 16 did not use other cellulose-base thickeners and did not use the methyl cellulose as well; and thus the strike-through evaluation was not good (NG). In each of the water base ink for ink-jet recording of Comparative Examples 17 to 19, the pigment was dispersed in the ink with the dispersing agent, rather than using the self-dispersible pigment; and thus the evaluation results were not good (NG) with respect to all of the evaluation items.

From the above results of the examples and comparative examples, it is appreciated that by using the methyl cellulose at the ratio (amount) of 0.01% by weight to 0.5% by weight together with diethylene glycol butyl ether, dipropylene glycol propyl ether or triethylene glycol butyl ether in a pigment ink, it is possible to obtain the pigment ink which is excellent in the printing density, the effect of preventing the "strike-through" and the drying property on paper surface.

In Examples 1 to 8 described above, any one of diethylene glycol butyl ether, dipropylene glycol propyl ether and triethylene glycol butyl ether was added to the pigment ink. However, any combination of diethylene glycol butyl ether, dipropylene glycol propyl ether and triethylene glycol butyl may be added to the pigment ink.

What is claimed is:

1. A water base ink for ink-jet recording comprising:
   a self-dispersible pigment;
   water;
   at least one glycol ether selected from the group consisting of diethylene glycol butyl ether, dipropylene glycol propyl ether and triethylene glycol butyl ether; and
   methyl cellulose in an amount of 0.01% by weight to 0.5% by weight;
   wherein the methyl cellulose has a methoxy substitution degree of 25% to 35%;
   a solution obtained by dissolving 20 g of the methyl cellulose in the water at 20° C. having a total volume of 1 liter, has a viscosity of 20 cP to 30 cP; and
   the glycol ether is contained in an amount of 0.5% by weight to 3% by weight.

2. The water base ink for ink jet recording according to claim 1, wherein the methyl cellulose has a weight-average molecular weight of 55,000 to 65,000.

3. The water base ink for ink jet recording according to claim 1, wherein the methyl cellulose is contained in an amount of 0.05% by weight to 0.3% weight.

4. The water base ink for ink jet recording according to claim 1, wherein the methyl cellulose is contained in an amount of 0.1% by weight to 0.5% weight.

5. The water base ink for ink jet recording according to claim 1, wherein the glycol ether is dipropylene glycol propyl ether or triethylene glycol butyl ether.

6. The water base ink for ink jet recording according to claim 1, wherein the self-dispersible pigment has carboxyl group as a surface functional group.

7. A water base ink set for ink-jet recording comprising:
   a pigment ink containing a self-dispersible pigment; water; at least one glycol ether selected from the group consisting of diethylene glycol butyl ether, dipropylene glycol propyl ether and triethylene glycol butyl ether; and methyl cellulose in an amount of 0.01% by weight to 0.5% by weight, and
   a dye ink containing a dye and water;
   wherein the methyl cellulose has a methoxy substitution degree of 25% to 35%;
   a solution obtained by dissolving 20 g of the methyl cellulose in the water at 20° C. and having a total volume of 1 liter, has a viscosity of 20 cP to 30 cP; and
   the glycol ether is contained in an amount of 0.5% by weight to 3% by weight.

8. A water base ink for ink jet recording comprising:
   a self-dispersible pigment;
   water;
   at least one glycol ether selected from the group consisting of diethylene glycol butyl ether, dipropylene glycol propyl ether and triethylene glycol butyl ether; and
   methyl cellulose in an amount of 0.01% by weight to 0.5% by weight;
   wherein the methyl cellulose has a weight-average molecular weight of 55,000 to 65,000; and
   the glycol ether is contained in an amount of 0.5% by weight to 3% by weight.

9. A water base ink set for ink jet recording comprising:
   a pigment ink containing a self-dispersible pigment; water; at least one glycol ether selected from the group consisting of diethylene glycol butyl ether, dipropylene glycol propyl ether and triethylene glycol butyl ether; and methyl cellulose in an amount of 0.01% by weight to 0.5% by weight, and
   a dye ink containing a dye and water;
   wherein the methyl cellulose has a weight-average molecular weight of 55,000 to 65,000; and
   the glycol ether is contained in an amount of 0.5% by weight to 3% by weight.

* * * * *